United States Patent
Church

[15] 3,647,180
[45] Mar. 7, 1972

[54] BUTTERFLY VALVE CONSTRUCTION
[72] Inventor: Herman S. Church, Cuyahoga Falls, Ohio
[73] Assignee: Teledyne-Mid America Corporation, Hartville, Ohio
[22] Filed: Apr. 6, 1970
[21] Appl. No.: 25,959

[52] U.S. Cl. .......................................................... 251/306
[51] Int. Cl. ..................................................... F16k 1/226
[58] Field of Search ................... 251/173, 305, 306, 307, 308

[56] References Cited

UNITED STATES PATENTS

| | | | |
|---|---|---|---|
| 3,173,650 | 3/1965 | Cotterman et al. | 251/306 |
| 3,079,123 | 2/1963 | Freemantle | 251/306 |
| 3,306,573 | 2/1967 | Trefil | 251/306 |
| 3,346,005 | 10/1967 | Hanssen | 251/306 X |
| 3,306,316 | 2/1967 | Stillwagon | 251/306 |

*Primary Examiner*—Henry T. Klinksiek
*Attorney*—Frease & Bishop

[57] ABSTRACT

A rubber gasket construction for butterfly valves which control the flow of fluids in pipelines and the like. The gasket is a precision-molded rubber component bonded in a complementary or shouldered cavity formed in a valve body. The gasket has shoulders on an external annular rib seated in shoulders or a complementary groove in the valve body, and may have diametrically opposed collars forming stem openings for the valve stem. A flat area is formed on the inside gasket surface surrounding each stem opening. The inside diameter of the gasket is smaller than the outer diameter of the valve disc which rotates within the valve body and gasket, and the valve may be a typical flanged-end valve.

The precision-molded gasket is molded and vulcanized separately. Then it is bonded, with a bonding adhesive under pressure and at elevated temperature, in a generally complementary cavity formed in the valve body.

3 Claims, 14 Drawing Figures

INVENTOR.
Herman S. Church
BY
Frease & Bishop
ATTORNEYS

INVENTOR.
Herman S. Church
BY
*Frease & Bishop*
ATTORNEYS

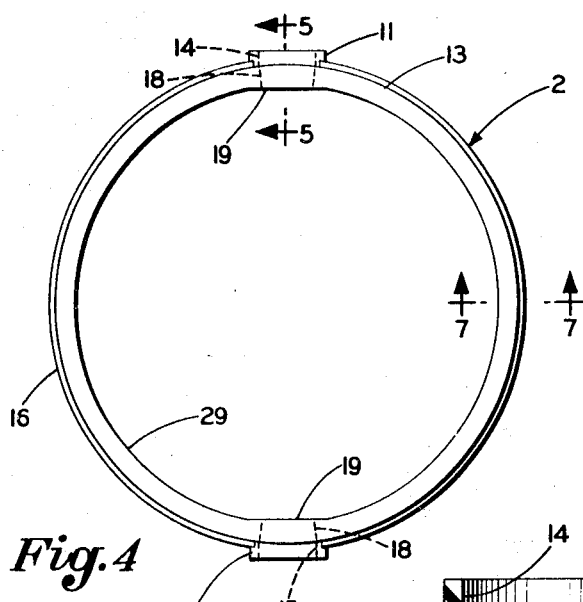
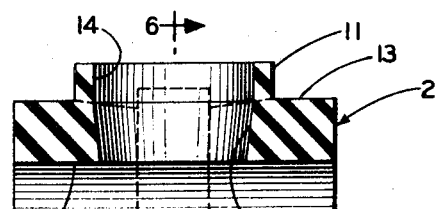
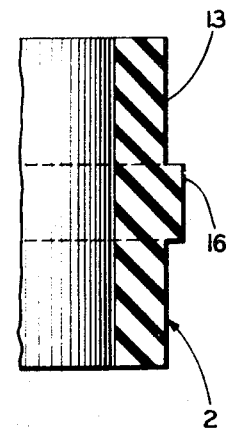
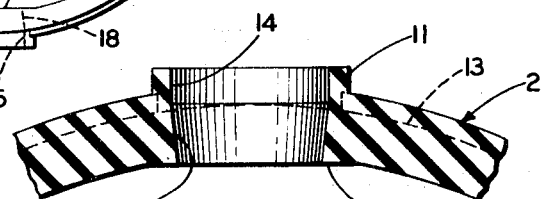
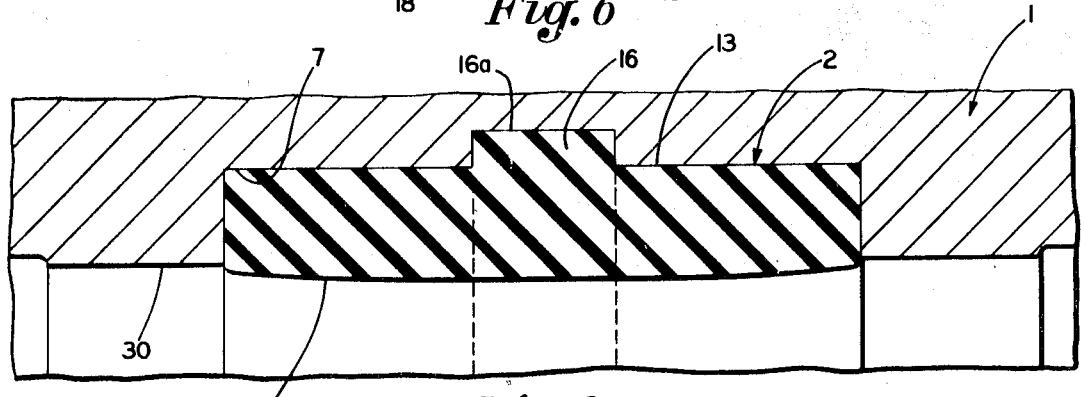
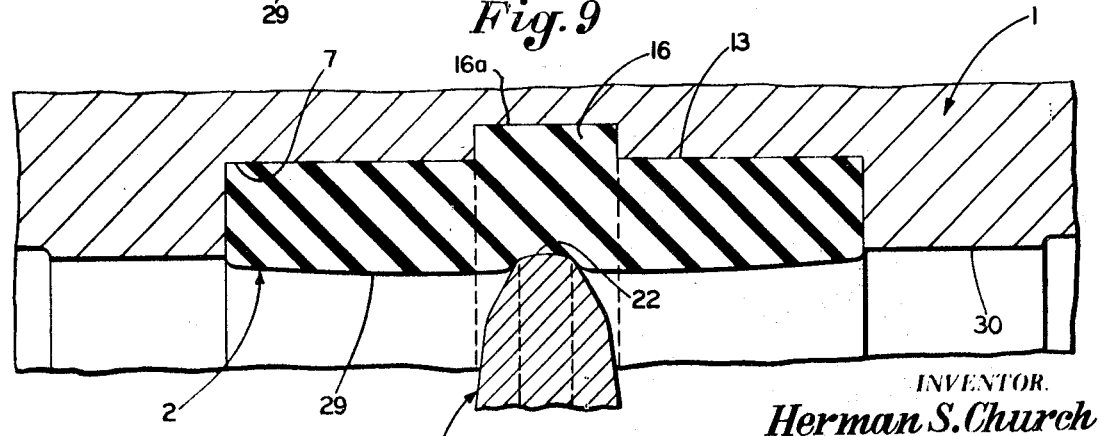

BUTTERFLY VALVE CONSTRUCTION

BACKGROUND OF THE INVENTION

1. Field of the Invention

The invention relates to valves and to internal gasket seal liners for sealing valve discs in closed position to stop the flow of liquids. More particularly the invention relates to a rubber gasket for butterfly valves of the type commonly used in waterlines and pipelines, in which the gasket is precision-molded and vulcanized and then later bonded to the valve body to form a liquidtight circumferential seal within the valve body for the butterfly valve disc.

2. Description of the Prior Art

Butterfly valves usually have been made by casting a valve body, then machining the casting to shape, then shipping the body to a rubber plant where a rubber seal gasket is molded and vulcanized in a cavity of the valve body, and then returning the valve body with the gasket vulcanized therein to the valve plant for final assembly, storage and distribution. Great expense is involved for shipping costs of heavy valve bodies which may weigh hundreds of pounds; for rubber plant-vulcanizing and molded equipment; and for maintaining inventories of all sizes and types of valves.

Vulcanized rubber shrinks on curing and cooling after molding which places the rubber seal or gasket component vulcanized in a recess in a metal valve body under tension. This tension can affect the bond between the rubber and metal as well as the permanent set, and also can impair the retained physical properties of the rubber. Also rubber under tension has reduced-abrasion resistance to materials flowing through the valve.

Various types of rubber are required for valves, depending upon the particular liquid to be handled by the valves, thus requiring an inventory to be maintained at the valve plant of all sizes and types of valves with all rubber-type gaskets so that valve orders may be filled quickly. This greatly multiplies the inventory investment required.

These are some of the age-old difficulties that have existed in the art for which a solution has been sought, without success, for many years.

SUMMARY OF THE INVENTION

Objectives of the invention include providing precision-molded rubber butterfly valve gaskets which may be bonded at a valve plant with an adhesive under pressure and at elevated temperature to and within generally complementary cavities in valve bodies; providing precision-molded gaskets formed of various desired rubber types which may be shipped easily and inexpensively to and stocked at a valve plant for selective bonding by simple operations to valve bodies as orders may require, thereby reducing inventory costs; providing precision-molded gaskets which have shrunk before bonding in valve bodies and carrying out simple bonding operations with the gaskets maintained under pressure so that the gasket rubber is under compression when bonded to the valve bodies, thus enhancing the retained physical properties, increasing abrasion resistance, maintaining an effective and efficient bond, and providing most favorable permanent set characteristics, and providing new gasket and butterfly valve constructions which have enhanced wear qualities, which have substantially reduced manufacturing costs, which eliminate age-old difficulties existing in the art and which solve existing problems, satisfy needs, and obtain new results in the art.

These objects and advantages are obtained by the gasket and butterfly valve constructions of the invention, the general nature of which may be stated as including in valve construction, a butterfly valve body having an internal preferably grooved gasket-receiving cavity and valve stem openings connected to the cavity, a precision-molded rubber ringlike gasket having, when the body cavity is grooved, an external annular rib and preferably diametrically opposed collars forming stem holes for the stem of a valve disc, said gasket being generally complementary to, but preferably slightly larger in external configuration than the grooved gasket-receiving cavity and stem openings in the valve body in which the gasket is received and bonded; the inside gasket surfaces surrounding the stem openings preferably being flat areas; the inside annular surface of the gasket being convexly curved in cross section and its diameter being slightly smaller than the outer diameter of the valve disc which rotates within the valve body and gasket; the precision-molded gasket being adhesively bonded with adhesive-bonding material in the valve body gasket-receiving cavity while held under compression at elevated temperature for a time sufficient to form an efficient bond; and the precision-molded gasket after being bonded to the valve body being under compression to obtain enhanced characteristics and properties.

BRIEF DESCRIPTION OF THE DRAWINGS

A preferred embodiment of the invention, illustrative of the best mode in which applicant has contemplated applying the principles, is set forth in the following description and shown in the drawings, and is particularly and distinctly pointed out and set forth in the appended claims.

FIG. 4 is a side view of the new precision-molded rubber gasket;

FIG. 5 is an enlarged fragmentary sectional view taken on line 5—5, FIG. 4;

FIG. 6 is a sectional view taken on line 6—6, FIG. 5;

FIG. 7 is an enlarged fragmentary sectional view taken on line 7—7, FIG. 4;

FIG. 9 is an enlarged fragmentary sectional view taken on line 9—9, FIG. 1;

FIG. 10 is an enlarged fragmentary sectional view taken on line 10—10, FIG. 8;

Similar numerals refer to similar parts throughout the drawings.

DESCRIPTION OF THE PREFERRED EMBODIMENTS

First Embodiment

Figure 1:
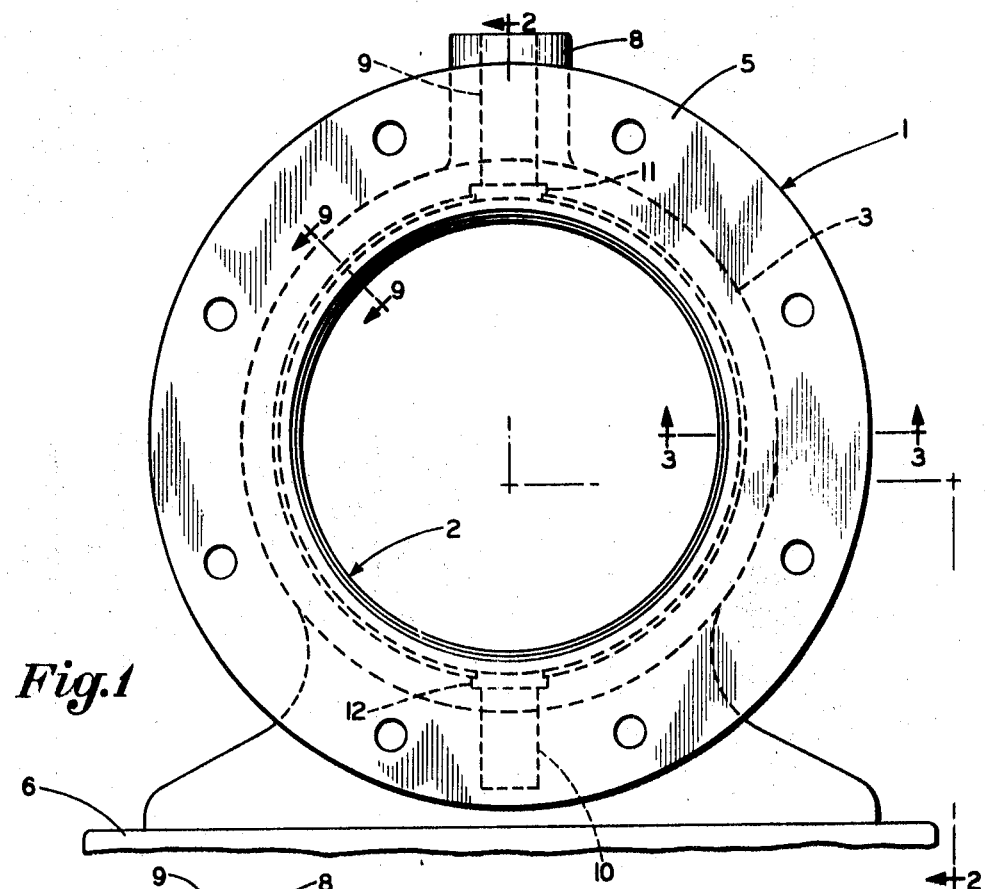
FIG. 1 of the drawings is a side view of a butterfly valve body equipped with the new gasket structure of the invention.

A typical flanged butterfly valve body is indicated at 1 (FIG. 1) with the improved gasket liner of the invention generally indicated at 2 mounted therein. Valve body 1 includes a cylindrical central portion 3 having flanged ends 4 and 5 and a base 6. Body portion 3 is formed with an annular gasket receiving cavity 7 in which the gasket 2 is located. A tubular boss 8 extends upward from valve portion 3 having a valve stem opening 9 formed therein, and a diametrically opposed valve stem opening 10 is formed in base 6. The valve body may be cast and machined in the usual manner.

Gasket 2 has an annular ringlike body formed with diametrically opposed collars 11 and 12 extending from its outer surface 13 forming valve stem openings 14 and 15, respectively, and an external annular rib 16 preferably centrally surrounds the gasket body and projects from its outer surface 13. Collar portions 11 and 12 preferably have uniform inner and outer diameters, and the remainder of the stem openings 14 and 15 below the collars 11 and 12 preferably are tapered at 18 as shown (FIGS. 5 and 6). A flat area 19 surrounds the inner end of tapered portions 18 of openings 14 and 15.

The valve is provided with a butterfly disc 20 from which upper and lower stem portions 17 and 21 extend. Valve disc 20 may have a slightly crowned outer edge surface 22 with a gradually thickened wall portion 23 and a thickened tubular portion 24 with reduced hubs 25 through which the central valve stem portion 26 extends. The stem 26 is secured to disc 20 by pins 27 while the end surfaces 28 of hub 25 are flat. Valve disc 20 also may be cast and machined in the usual manner.

Gasket 2 in accordance with the invention is precision-molded in a rubber plant to very accurate and precise dimensions within very close tolerances as to the shape and size of the outer surfaces of gasket 2 with respect to the shape and size of the gasket-receiving cavity 7 in valve body 1. The outer contour of gasket 2 is very slightly larger dimensionally than the matching contour of valve body cavity 7 so that gasket 2 is under compression, however slight, when assembled in the gasket-receiving cavity 7 with the gasket rib 16 seated in the matching annular groove 16a formed centrally in annular cavity 7. The inner annular gasket surface 29 has a slightly smaller diameter than the inner diameter of the annular opening 30 through valve body 1 as shown in an exaggerated fashion in FIG. 9. Thus, the inner annular gasket surface 29 is slightly crowned or convex, and thus projects slightly inward of the valve opening as shown in FIG. 9, for several purposes to be described.

Gasket 2 may be molded of neoprene rubber, butyl rubber, hycar rubber, urethane rubber, and the like. The type of rubber used depends upon the characteristics desired for handling some particular liquid that will flow through the valve.

In precision-molding gasket 2, usual molding procedures are used involving vulcanization of the rubber. Thus, after precision-molding any shrinkage which inevitably occurs in connection with molding vulcanized rubber parts will have taken place in the manufacture of gaskets 2. The size of the gasket after any such shrinkage is the ultimate final precision-molded size desired and required. This is one of the fundamental concepts of the invention in that there is no shrinkage of gasket 2 during and after being bonded to the valve body, which would result in the gasket rubber being placed under tension as a result of the bonding operation. This heretofore has been a characterizing defect in the vulcanizing of rubber parts as liners in butterfly valves.

In accordance with the invention, the precision-molded gaskets 2 are shipped or otherwise supplied to the valve maker or valve plant for bonding to the valve bodies 1, rather than shipping the heavy valve bodies 1 to a rubber plant for vulcanizing a liner therein. This new concept involves great savings in shipping charges. Furthermore, the gaskets formed of the various types of rubber described may be stocked merely as such, as inventory at the valve plant and bonded to valve bodies when needed to supply orders.

Figure 12:
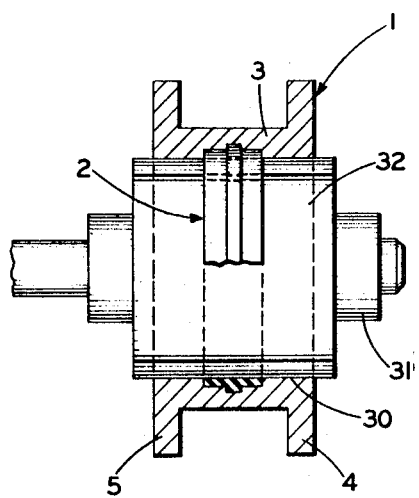
FIG. 12 is a diagrammatic view of a mandrel inserted through the valve body used for bonding the gasket to the valve body.

The procedure for assembling and bonding the gaskets in a valve body is very simple and requires no molds for completing the operation. The gasket 2 is inserted in the gasket-receiving cavity in a valve body 1, as shown for example in FIGS. 9 and 12. A mandrel 31 having an expansible assembly 32 thereon is inserted through the opening 30 in valve body 1, and the assembly 32 is expanded slightly to engage the crowned inner annular surface 29 of gasket 2 so as to place the same under compression.

Heating means may be supplied to the mandrel 31 and assembly 32 so that the gasket may be heated to say 280° F. for from 2 to 3 hours while carrying out the bonding operation. A usual after-cure adhesive cement is applied to the outer surface of gasket 2 and the inner surface of cavity 7 or both to provide adhesive for bonding the rubber gasket 2 to the valve body 1. After the heating under compression has taken place for the time necessary to accomplish bonding, mandrel 31 is removed and gasket 2 is efficiently bonded and held under compression within the cavity 7 as shown in FIG. 9.

If desired, a typical steam bag may be used for the bonding operation rather than the expansible mandrel 31—32.

Figure 8:
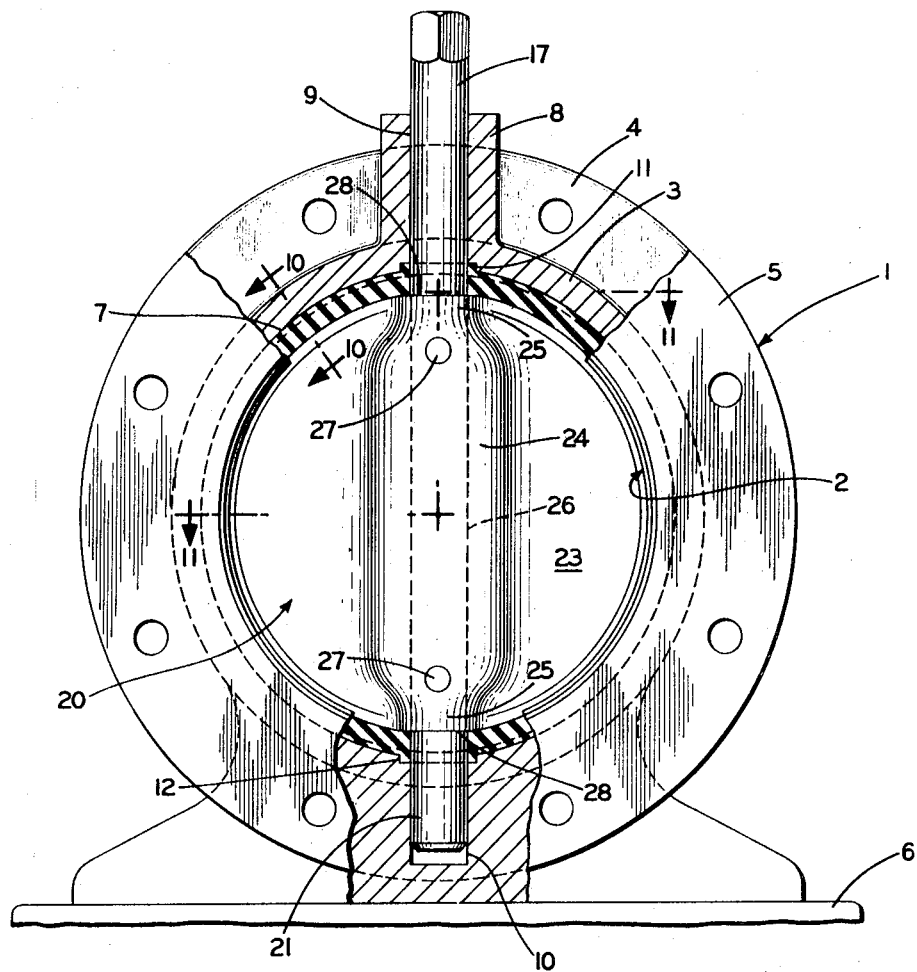
FIG. 8 is a side view of the assembled butterfly valve with parts broken away.
Figure 11:
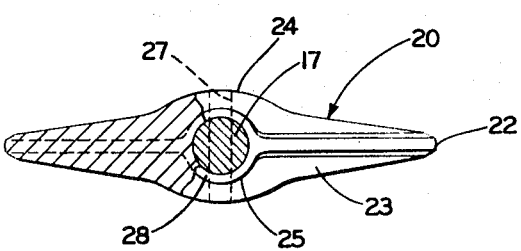
FIG. 11 is a view of the valve disc taken on line 11—11, FIG. 8.

The inner gasket surface 29 with a diameter smaller than the diameter of valve opening 30 serves an effective sealing purpose. When valve disc 20 with its stem 17—21—26 assembled therewith is assembled in valve body 1, it is rotatable between open and closed positions, the closed position being shown in FIGS. 8 and 10. The outer diameter of the slightly crowned outer edge 22 of valve disc 20 must have a diameter slightly smaller than the diameter of valve opening 30 in order to be assembled in the valve. However, the valve disc 20 in order to seal properly when closed, must be able to seat within gasket 2. This sealing-seating is accomplished by the slightly crowned surface 29 of the gasket 2 with its internal diameter smaller than that of the valve body opening 30, as well shown in FIG. 10.

Furthermore, when the valve stem portions 17 and 21 of valve disc 20 pass through the tapered portions 18 of valve stem openings 14 and 15 in gasket 2, the tapered portions and their flat undersurfaces or areas 19 are compressed and seat and seal against the end surfaces 28 of the hubs 25 around the valve stem portions 17 and 21.

The new procedural concepts of the present invention for the manufacture of butterfly valves with rubber gasket liners or seals provides a most efficient bond for the rubber in that the rubber is under compression rather than tension as bonded to the valve body-casting, provides for enhanced permanent set characteristics and physical properties for the butterfly valve gasket, and provides enhanced gasket abrasion resistance characteristics. Also, the new concepts provide for the bonding of a gasket which is precision-molded, and without shrinkage after molding, to the valve body at a valve assembly area or valve plant rather than at a molding or vulcanizing department of a rubber plant.

Second Embodiment

Figure 13:
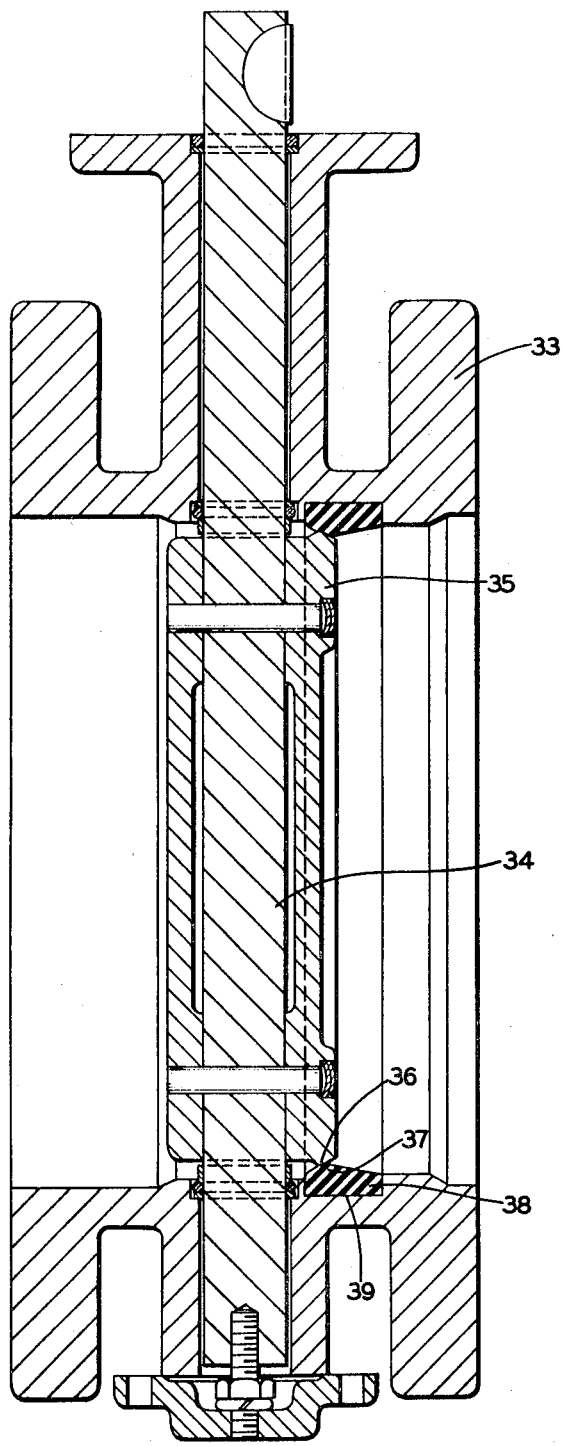
FIG. 13 is a view similar to FIG. 2 of a modified form of flanged butterfly valve with a precision-molded rubber gasket bonded thereto in accordance with the invention.

Modified arrangements of the new concepts are illustrated in FIG. 13. The valve body 33 has a stem 34 and a valve disc 35 which has a gasket-engaging rib 36 offset from the axis of the valve stem. Rib 36 seats and seals on crowned annular inner surface 37 of gasket ring 38 which is bonded under compression in recess 39 formed in the valve body 33.

The contiguous bonded surfaces of the gasket 38 and recess 39 are complementary but a rib and valve stem openings and collars (present in the valve of FIGS. 1 to 12) are omitted from gasket 38 because of the offset disc 36.

Figure 2:
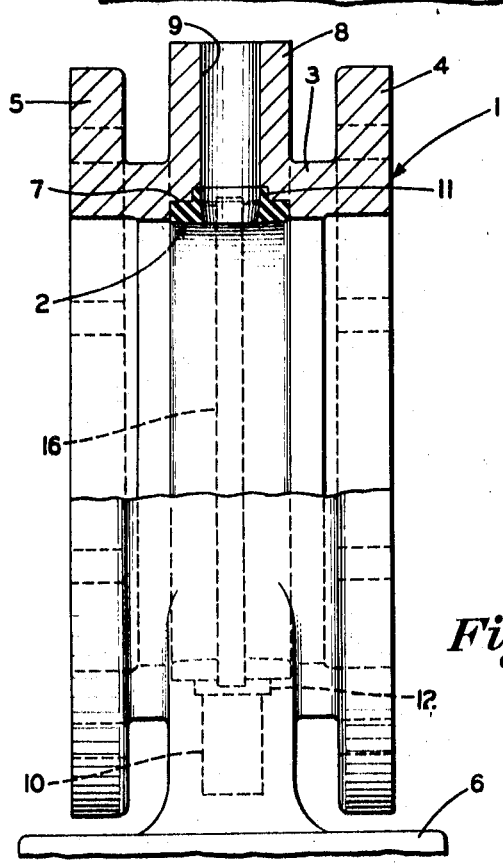
FIG. 2 is a sectional view taken on line 2—2, FIG. 1.

Otherwise, the structure of the valve of FIG. 13 is fundamentally the same as that of FIG. 2 from the standpoint of the new concepts of precision-molded gaskets subsequently bonded under compression in valve body cavities. Even though the gasket 38 has no projecting rib, its shouldered corners seat in complementary shouldered corners in body recess 39.

Third Embodiment

Figure 3:
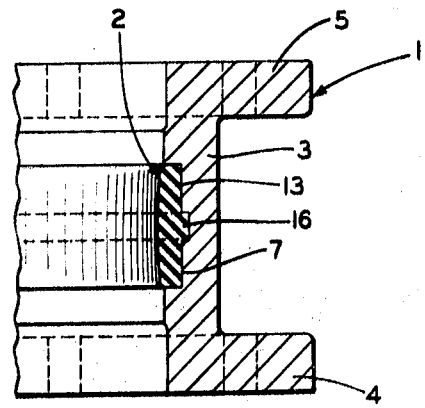
FIG. 3 is a fragmentary sectional view taken on line 3—3, FIG. 1.
Figure 14:
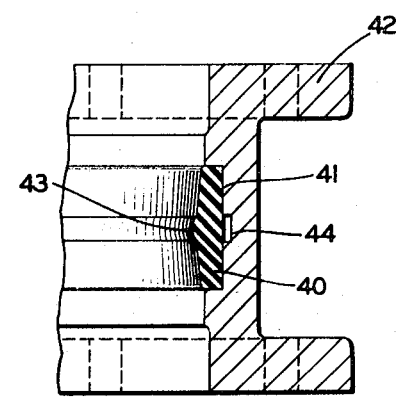
FIG. 14 is a view similar to FIG. 3 of another modified form of construction.

The form of construction shown in FIG. 14 is very similar to that of FIG. 3 except that gasket 40 has no external rib and thus has outer surfaces only generally complementary to the shape of the grooved body recess 41 in valve body 42. Gasket 40 also preferably has a slight internal valve disc-engaging rib 43 on its inner surface opposite the location of the groove 44 in valve body recess 41.

Gasket 40 is bonded under compression in recess 41. However, the portion of gasket 40 in and adjacent rib 43 may flex more easily in engaging the valve disc because the adjacent gasket zone is not backed up due to the presence of groove 44.

IN GENERAL

Accordingly, the new butterfly valve and gasket constructions and the procedures for bonding gaskets to valves which characterize the present invention provide a gasket which can be molded of various types of rubber to precision size and shape and which can be bonded after precision-molding selectively to valve bodies when the particular type of rubber-lined valve is desired; provide a procedure by which major shipping costs in the manufacture of butterfly valves may be eliminated by eliminating shipment of heavy valve bodies to and from a rubber plant for molding and vulcanizing gaskets therein; provide a gasket construction in a butterfly valve wherein the gasket material is under compression, thereby achieving most favorable gasket characteristics; provide for bonding rubber gaskets to butterfly valve bodies without requiring complicated rubber-vulcanizing and molding equipment; and provide structures, arrangements and procedures which are very simplified, which eliminate difficulties existing in the art, and which achieve the stated objectives and solve problems that have existed in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the precision-molded gasket is made and bonded to valve bodies, the new butterfly valve-manufacturing procedures, the characteristics of the new construction, and the advantageous, new and useful results obtained; the new and useful structures, devices, elements, arrangements, parts, combinations, procedures and methods are set forth in the appended claims.

I claim:

1. Butterfly valve construction including a valve body having an annular gasket-receiving cavity formed therein, a precision-molded rubber gasket having an outer contour generally complementary to but slightly larger than the contour of said cavity bonded under compression in said cavity, the valve body having a valve opening therethrough interrupted by said gasket, and the inner annular surface of said gasket being slightly crowned in cross section and having a diameter smaller than the inner diameter of the valve opening.

2. The construction defined in claim 1 in which the gasket has an internal annular rib formed in its slightly crowned inner annular surface.

3. Butterfly valve construction including a valve body having an annular gasket receiving cavity formed therein, an annular groove formed centrally in said annular cavity; a precision-molded rubber gasket having an annular ringlike body, the body having an outer surface, diametrically opposed collars extending from the outer body surface-forming valve stem openings, external annular rib means centrally surrounding the gasket body and projecting from said outer surface between said collars; the gasket body having an outer contour generally complementary to but slightly larger than the contour of said cavity, and the gasket being bonded under compression to the valve body in said cavity; the valve body having a valve opening therethrough interrupted by said cavity and gasket; and the inner annular surface of said gasket-projecting slightly inward in respect to said valve body opening with a diameter smaller than the inner diameter of the valve body opening, whereby a butterfly valve disc having a diameter slightly smaller than the inner diameter of the valve body opening when assembled and in closed position in the valve body has its outer edge seal-seated against the inwardly projecting inner annular gasket surface.

* * * * *